United States Patent
Yee

(10) Patent No.: US 9,953,213 B2
(45) Date of Patent: Apr. 24, 2018

(54) SELF DISCOVERY OF AUTONOMOUS NUI DEVICES

(71) Applicant: Microsoft Technology Licensing, LLC., Redmond, WA (US)

(72) Inventor: Dawson Yee, Medina, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 411 days.

(21) Appl. No.: 13/851,459

(22) Filed: Mar. 27, 2013

(65) Prior Publication Data

US 2014/0293008 A1    Oct. 2, 2014

(51) Int. Cl.
| | |
|---|---|
| H04N 13/02 | (2006.01) |
| G06K 9/00 | (2006.01) |
| G06F 3/00 | (2006.01) |
| G06F 3/01 | (2006.01) |
| G06F 3/03 | (2006.01) |

(52) U.S. Cl.
CPC ......... G06K 9/00335 (2013.01); G06F 3/005 (2013.01); G06F 3/017 (2013.01); G06F 3/0325 (2013.01); H04N 13/0203 (2013.01); G06F 2203/0382 (2013.01)

(58) Field of Classification Search
CPC  G06K 9/00335; H04N 13/0203; G06F 3/017; G06F 3/0325; G06F 3/005; G06F 2203/0382
USPC .......................................................... 348/46
See application file for complete search history.

(56) References Cited

U.S. PATENT DOCUMENTS

| | | | |
|---|---|---|---|
| 4,627,620 A | 12/1986 | Yang | |
| 4,630,910 A | 12/1986 | Ross et al. | |
| 4,645,458 A | 2/1987 | Williams | |
| 4,695,953 A | 9/1987 | Blair et al. | |

(Continued)

FOREIGN PATENT DOCUMENTS

| | | | |
|---|---|---|---|
| CN | 101254344 B | 6/2010 | |
| CN | 101943973 A | 1/2011 | |

(Continued)

OTHER PUBLICATIONS

Cerpa, et al., "ASCENT: Adaptive Self-Configuring Sensor Networks Topologies", in IEEE Transactions on Mobile Computing, vol. 3, Issue 3, Jul. 2004, 14 pages.

(Continued)

*Primary Examiner* — Andy Rao
*Assistant Examiner* — Zaihan Jiang
(74) *Attorney, Agent, or Firm* — Alleman Hall Creasman & Tuttle LLP

(57) ABSTRACT

A system and method providing a capture device autonomously determining its own operational window in the presence of other such devices. The capture device includes an imaging sensor having a field of view and an illumination source. A processor includes code instructing the processor to scan the field of view another illumination source operating in a recurring window of time proximate to the capture device. If illumination occurs from another source within the recurring window, an operational window for the second illumination source is determined an a new a new operational window within the recurring window established for the capture device.

17 Claims, 9 Drawing Sheets

(56) References Cited

U.S. PATENT DOCUMENTS

| | | | |
|---|---|---|---|
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 6/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,774,893 B2 * | 8/2004 | Debiez ............... G11B 15/68 345/207 |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |

(56) References Cited

U.S. PATENT DOCUMENTS

| | | | |
|---|---|---|---|
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,809,167 B2 | 10/2010 | Bell | |
| 7,821,533 B2* | 10/2010 | Renkis | G08B 13/19615 348/143 |
| 7,834,846 B1 | 11/2010 | Bell | |
| 7,852,262 B2 | 12/2010 | Namineni et al. | |
| 7,874,917 B2 | 1/2011 | Marks et al. | |
| RE42,256 E | 3/2011 | Edwards | |
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 9,247,238 B2* | 1/2016 | Izadi | H04N 13/0271 |
| 2008/0026838 A1 | 1/2008 | Dunstan et al. | |
| 2010/0150404 A1 | 6/2010 | Marks et al. | |
| 2012/0116548 A1* | 5/2012 | Goree | A61B 5/1118 700/90 |
| 2012/0188452 A1* | 7/2012 | Keiser | G06T 13/00 348/559 |
| 2012/0194650 A1 | 8/2012 | Izadi et al. | |
| 2013/0320092 A1* | 12/2013 | Bremer | G06K 7/10752 235/472.01 |
| 2014/0168378 A1* | 6/2014 | Hall | H04N 13/0246 348/47 |

FOREIGN PATENT DOCUMENTS

| | | |
|---|---|---|
| CN | 102323863 A | 1/2012 |
| EP | 0583061 A2 | 2/1994 |
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

Lanzisera, et al., "RF Time of Flight Ranging for Wireless Sensor Network Localization", In International Workshop on Intelligent Solutions in Embedded Systems, Jun. 30, 2006, 12 pages.

Kim, et al., "Design and Calibration of a Multi-view TOF Sensor Fusion System", in IEEE Computer Society Conference on Computer Vision and Pattern Recognition Workshops, Jun. 23, 2008, 7 pages.

Bergamo, et al., "Localization in Sensor Networks with Fading and Mobility", In 13th IEEE International Symposium on Personal, Indoor and Mobile Radio Communications, Sep. 15, 2002, 5 pages.

Zhang, et al., "A Self-Reconfigurable Camera Array", In International Conference on Computer Graphics and Interactive Techniques, Aug. 8, 2004, 12 pages.

International Search Report & Written Opinion, dated Jul. 25, 2014, in PCT Patent Application No. PCT US2014/031677 filed Mar. 25, 2014, 10 pages.

Zhang Lin, "TraumaBot—3D Body Reconstruction & Recognition: Experiments on Interference Problem of Two Kinects", Mar. 18, 2013, XP055129894, URL: http://traumabot.blogspot.de/2013/03/experiments-on-interference-problem-of.html.

Schroder et al., "Multiple Kinect Studies—Technical Report Sep. 9, 2015", Oct. 5, 2011, XP055130343, URL: http://www.cg.cs.tu-bs.de/media/publications/multikinects_1.pdf.

Faion et al: "Intelligent Sensor-Scheduling for Multi-Kinect-Tracking", 2012 IEEE/RSJ International Conference on Intelligent Robots and Systems (IROS), Oct. 7, 2012 (Oct. 7, 2012), 3993-3999, XP032287853, DOI: 10.1109/IROS.2012.6386007, ISBN: 978-1-4673-1737-5.

Amendment dated Oct. 14, 2014, in PCT Patent Application No. PCT/US2014/031677 filed Mar. 25, 2014.

"International Preliminary Report on Patentability Issued in PCT Application No. PCT/US2014/031677", dated Jul. 13, 2015, 7 pages.

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol.15, No. 6, IEEE Transactions on Pattern Analysis and Machine Intelligence.

Granieri et al., "Simulating Humans in VR", The British Computer Society, Oct. 1994, Academic Press.

(56) References Cited

OTHER PUBLICATIONS

Brogan et al., "Dynamically Simulated Characters in Virtual Environments", Sep./Oct. 1998, pp. 2-13, vol. 18, Issue 5, IEEE Computer Graphics and Applications.
Fisher et al., "Virtual Environment Display System", ACM Workshop on Interactive 3D Graphics, Oct. 1986, Chapel Hill, NC.
"Virtual High Anxiety", Tech Update, Aug. 1995, pp. 22.
Sheridan et al., "Virtual Reality Check", Technology Review, Oct. 1993, pp. 22-28, vol. 96, No. 7.
Stevens, "Flights into Virtual Reality Treating Real World Disorders", The Washington Post, Mar. 27, 1995, Science Psychology, 2 pages.
"Simulation and Training", 1994, Division Incorporated.
English Machine-translation of Japanese Publication No. JP08-044490 published on Feb. 16, 1996.
"First Office and Search Report Issued in Chinese Patent Application No. 201480018853.6", dated Jun. 15, 2017, 11 pages.

* cited by examiner

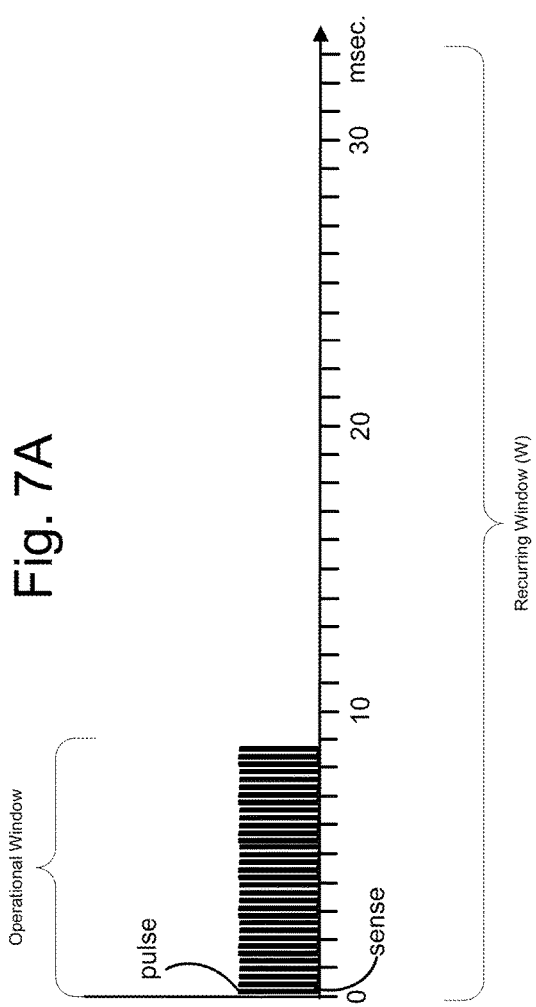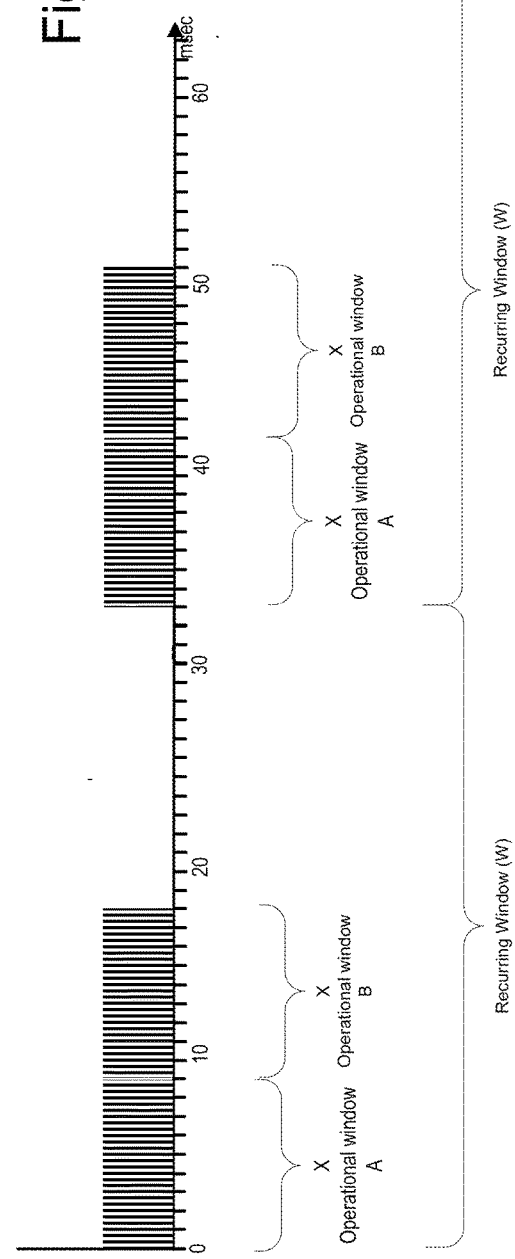

SELF DISCOVERY OF AUTONOMOUS NUI DEVICES

BACKGROUND

In the past, computing applications such as computer games and multimedia applications have used controllers, remotes, keyboards, mice, or the like to allow users to manipulate game characters or other aspects of an application. More recently, computer games and multimedia applications have begun employing cameras and motion recognition to provide a human computer interface ("HCI"). With HCI, user gestures are detected, interpreted and used to control game characters or other aspects of an application.

There are a number of gaming applications where users seek to participate in games collectively—at the same location using different processing devices. Typically, devices which provide a human computer interface using imaging have no mechanism for ensuring correct operation when each of the devices is operating separately, on their own processing system.

SUMMARY

Technology is provided to enable multiple capture devices to interact in the same physical space in an autonomous manner. Each capture device includes the ability to capture device detecting movements of a user in a first physical environment using an imaging sensor having a field of view and an illumination source. Upon initialization or calibration of the device, code instructs a processor controlling the illumination source and the sensor to power off the illumination source and scan the field of view using the depth imaging sensor for any other illumination sources operating in a recurring window of time. If detected, the timing of operational windows of time from other illumination sources within the recurring window are determined and a non-conflicting operational window for the current device is established outside these operational windows, but within the recurring pulse width window of the devices. This allows each device to thereafter operate within its own operational window by repeatedly engaging the depth illumination source in a new recurring operational window at a time outside any existing operational windows and receive reflected illumination from the device illumination source within the new operational window.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 7A and 7B illustrate operational windows relative to a recurring window.

DETAILED DESCRIPTION

Technology is provided to enable multiple capture devices which provide natural user interfaces to interact in the same physical space. Each capture device includes the ability to capture device detecting movements of a user in a first physical environment. Each capture device includes a depth imaging sensor having a field of view and a device illumination source. Upon initialization or calibration of the device, code instructs a processor controlling the illumination source and the sensor to power off the illumination source and scan the field of view using the depth imaging sensor for any other illumination sources operating in a recurring window of time proximate to the capture device. If detected, any operational windows of time with other illumination sources within the recurring window are determined and a non-conflicting operational window for the current device is established outside these operational windows, but within the recurring pulse width window of the devices. This allows each device to thereafter operate within its own operational window by repeatedly engaging the depth illumination source in a new recurring operational window at a time outside any existing operational windows and receive reflected illumination from the device illumination source within the new operational window.

Figure 1:
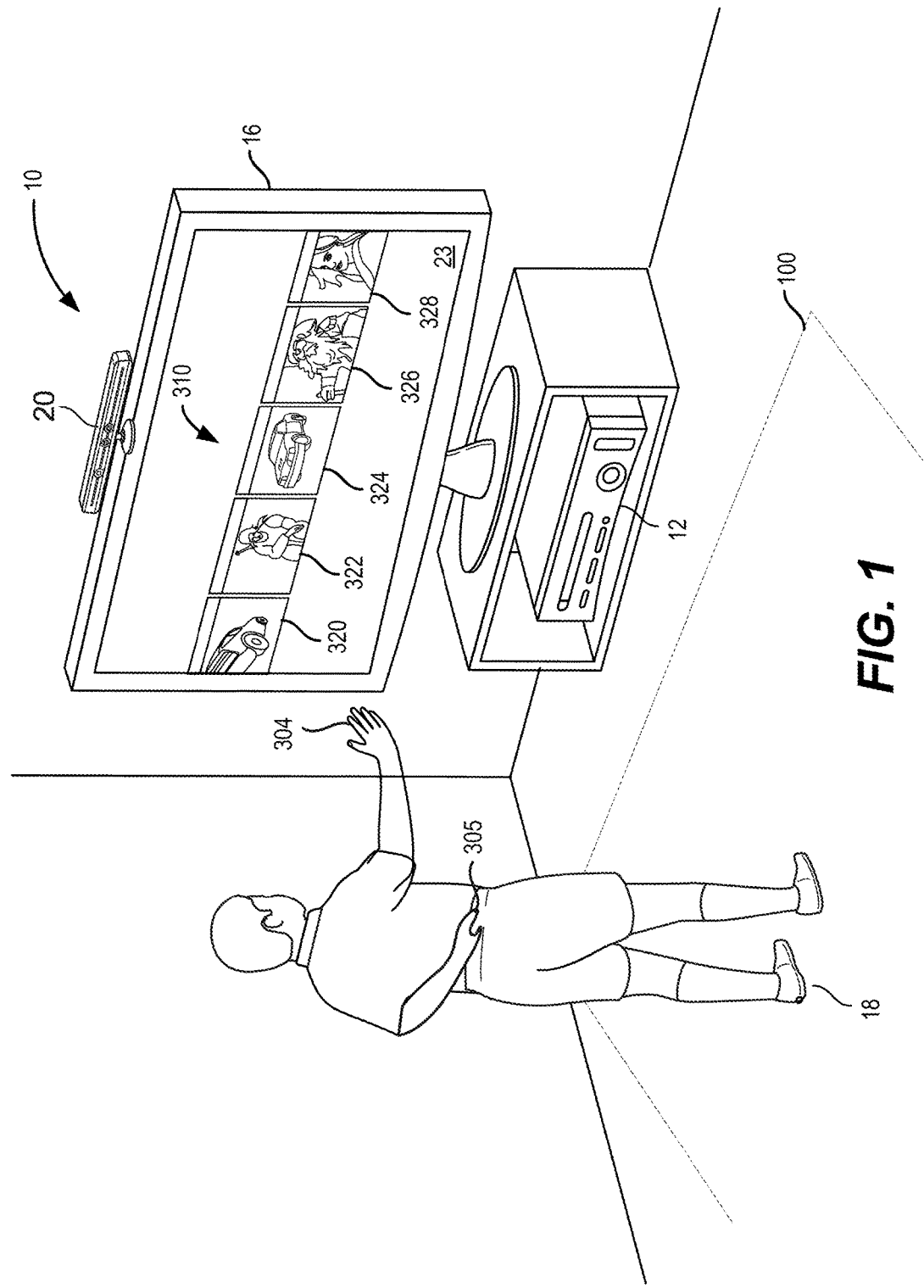
FIG. 1 illustrates one embodiment of a target recognition, analysis and tracking system with a user performing a gesture to control a user-interface.

FIG. 1 illustrates one embodiment of a target recognition, analysis and tracking system 10 (generally referred to as a tracking system hereinafter) with a user 18 interacting with a system user-interface 23. The target recognition, analysis and tracking system 10 may be used to recognize, analyze, and/or track a human target such as the user 18, and provide a human controlled interface.

As shown in FIG. 1, the tracking system 10 may include a computing environment 12. The computing environment 12 may be a computer, a gaming system or console, or the like. According to one embodiment, the computing environment 12 may include hardware components and/or software components such that the computing environment 12 may be used to execute an operating system and applications such as gaming applications, non-gaming applications, or the like. In one embodiment, computing environment 12 may include a processor such as a standardized processor, a specialized processor, a microprocessor, or the like that may execute instructions stored on a processor readable storage device for performing the processes described herein.

As shown in FIG. 1, the tracking system 10 may further include a capture device 20. The capture device 20 may be, for example, a camera that may be used to visually monitor one or more users, such as the user 18, such that gestures performed by the one or more users may be captured, analyzed, and tracked to perform one or more controls or actions for the user-interface of an operating system or application.

The capture device may be positioned on a three-axis positioning motor allowing the capture device to move relative to a base element on which it is mounted. The positioning motor allows the capture device to scan a greater range of a physical environment 100 in which the capture device 20 is places.

According to one embodiment, the tracking system 10 may be connected to an audiovisual device 16 such as a television, a monitor, a high-definition television (HDTV), or the like that may provide game or application visuals and/or audio to a user such as the user 18. For example, the computing environment 12 may include a video adapter such as a graphics card and/or an audio adapter such as a sound card that may provide audiovisual signals associated with the game application, non-game application, or the like. The audiovisual device 16 may receive the audiovisual signals from the computing environment 12 and may output the game or application visuals and/or audio associated with the audiovisual signals to the user 18. According to one embodiment, the audiovisual device 16 may be connected to the computing environment 12 via, for example, an S-Video cable, a coaxial cable, an HDMI cable, a DVI cable, a VGA cable, or the like.

As shown in FIG. 1, the target recognition, analysis and tracking system 10 may be used to recognize, analyze, and/or track one or more human targets such as the user 18. For example, the user 18 may be tracked using the capture device 20 such that the movements of user 18 may be interpreted as controls that may be used to affect an application or operating system being executed by computer environment 12.

Consider a user interface application such as a boxing game executing on the computing environment 12. The computing environment 12 may use the audiovisual device 16 to provide a visual representation of a boxing opponent to the user 18 and the audiovisual device 16 to provide a visual representation of a player avatar that the user 18 may control with his or her movements. The user 18 may make movements (e.g., throwing a punch) in physical space to cause the player avatar to make a corresponding movement in game space. Movements of the user may be recognized and analyzed in physical space such that corresponding movements for game control of the player avatar in game space are performed.

Some movements may be interpreted as controls that may correspond to actions other than controlling a player avatar or other gaming object. For example, the player may use movements to end, pause, or save a game, select a level, view high scores, communicate with a friend, etc. Virtually any controllable aspect of an operating system and/or application may be controlled by movements of the target such as the user 18. The player may use movements to select a game or other application from a main user interface. A full range of motion of the user 18 may be available, used, and analyzed in any suitable manner to interact with an application or operating system.

In FIG. 1 user 18 is interacting with the tracking system 10 to control the system user-interface (UI) 23, which in this particular example is displaying a list 310 of menu items 320-330. The individual items may represent applications or other UI objects. A user may scroll left or right (as seen from the user's point of view) through the list 310 to view other menu items not in the current display but also associated with the list, select menu items to trigger an action such as opening an application represented by the menu item or further UI controls for that item. The user may also move backwards through the UI to a higher level menu item in the UI hierarchy.

The system may include gesture recognition, so that a user may control an application or operating system executing on the computing environment 12, which as discussed above may be a game console, a computer, or the like, by performing one or more gestures. In one embodiment, a gesture recognizer engine, the architecture of which is described more fully below, is used to determine from a skeletal model of a user when a particular gesture has been made by the user.

Generally, as indicated in FIG. 1, a user 18 is confined to a physical environment 100 when using a capture device 20. The environment 100 is generally the best performing range of the capture device 20.

The virtual object navigation system may utilize a body part tracking system that uses the position of some body parts such as the head, shoulders, hip center, knees, ankles, etc. to calculate some derived quantities, and then uses these quantities to calculate the camera position of the virtual observer continuously (i.e. frame-over-frame) in real time in an analog manner rather than digital (i.e. subtle movements of the user result in subtle movements of the camera, so that rather than simple left/right movement the user may move the camera slowly or quickly with precision left/right, or in any other direction).

For instance, various motions of the hands or other body parts may correspond to common system wide tasks such as to navigate up or down in a hierarchical menu structure, scroll items in a menu list, open a file, close a file, and save a file. Gestures may also be used in a video-game-specific context, depending on the game. For instance, with a driving game, various motions of the hands and feet may correspond to steering a vehicle in a direction, shifting gears, accelerating, and braking.

Figure 2:
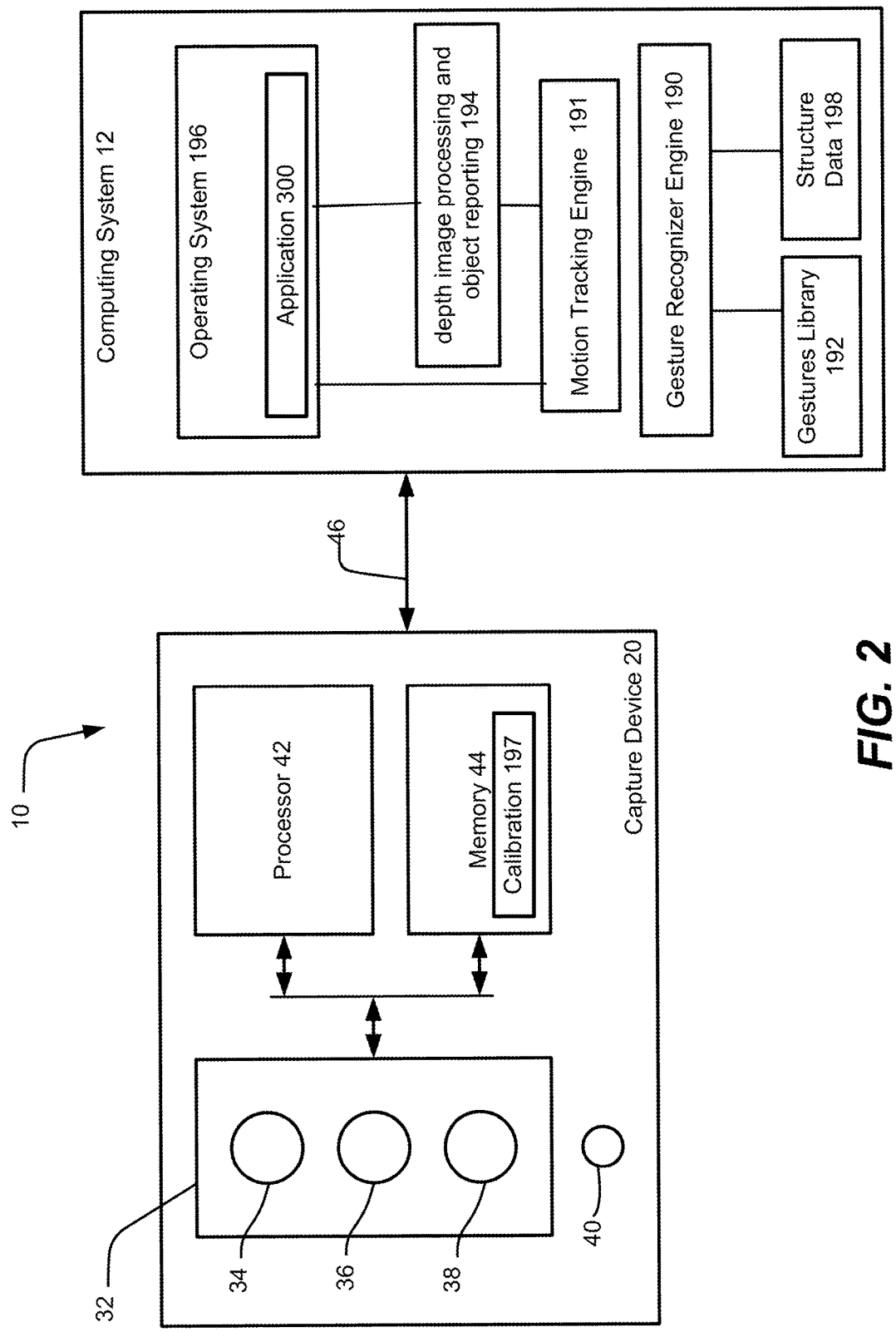
FIG. 2 illustrates one embodiment of a capture device in accordance with the present technology.

In FIG. 1, the user performs a right-handed gesture to scroll the list of menu items to the left as seen from the user's point of view. The user begins with his right hand in position 304 as shown in FIG. 1, then moves it to position 306 toward the left side of his body. The list 310 of menu items 320-328 is in a first position in FIG. 1 when the user begins the gesture with his hand at position 304. In FIG. 2, the user has moved his hand to position 306, causing the list of menu items to change by scrolling the list 310 of menu items to the left. Menu item 320 has been removed from the list as a result of scrolling to the left (as defined in user's 18 point of view). Each of items 322-328 has moved one place to the left, replacing the position of the immediately preceding item. Item 330 has been added to the list, as a result of scrolling from the right to the left.

FIG. 2 illustrates one embodiment of a capture device 20 and computing environment 12 that may be used in the target recognition, analysis and tracking system 10 to recognize human and non-human targets in a capture environment 100 (without special sensing devices attached to the subjects), uniquely identify them and track them in three dimensional space. According to one embodiment, the capture device 20 may be configured to capture video with depth information including a depth image that may include depth values via any suitable technique including, for example, time-of-flight, structured light, stereo image, or the like. According to one embodiment, the capture device 20 may organize the calculated depth information into "Z layers," or layers that may be perpendicular to a Z-axis extending from the depth camera along its line of sight.

As shown in FIG. 2, the capture device 20 may include an image camera component 32. According to one embodiment, the image camera component 32 may be a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

As shown in FIG. 2, the image camera component 32 may include an IR light source 34, a three-dimensional (3-D) camera 36, and an RGB camera 38 that may be used to capture the depth image of a capture area. For example, in time-of-flight analysis, the IR light source 34 of the capture device 20 may emit an infrared light onto the capture area and may then use sensors to detect the backscattered light from the surface of one or more targets and objects in the capture area using, for example, the 3-D camera 36 and/or the RGB camera 38. In some embodiments, pulsed infrared light may be used such that the time between an outgoing light pulse and a corresponding incoming light pulse may be measured and used to determine a physical distance from the capture device 20 to a particular location on the targets or objects in the capture area. Additionally, the phase of the outgoing light wave may be compared to the phase of the incoming light wave to determine a phase shift. The phase shift may then be used to determine a physical distance from the capture device to a particular location on the targets or objects.

According to one embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example, the capture device 20 may use structured light to capture depth information. In such an analysis, patterned light (i.e., light displayed as a known pattern such as grid pattern or a stripe pattern) may be projected onto the capture area via, for example, the IR light source 34. Upon striking the surface of one or more targets or objects in the capture area, the pattern may become deformed in response. Such a deformation of the pattern may be captured by, for example, the 3-D camera 36 and/or the RGB camera 38 and may then be analyzed to determine a physical distance from the capture device to a particular location on the targets or objects.

According to one embodiment, the capture device 20 may include two or more physically separated cameras that may view a capture area from different angles, to obtain visual stereo data that may be resolved to generate depth information. Other types of depth image sensors can also be used to create a depth image.

The capture device 20 may further include a microphone 40. The microphone 40 may include a transducer or sensor that may receive and convert sound into an electrical signal. According to one embodiment, the microphone 40 may be used to reduce feedback between the capture device 20 and the computing environment 12 in the target recognition, analysis and tracking system 10. Additionally, the microphone 40 may be used to receive audio signals that may also be provided by the user to control applications such as game applications, non-game applications, or the like that may be executed by the computing environment 12.

In one embodiment the microphone 40 comprises array of microphone with multiple elements, for example four elements. The multiple elements of the microphone can be used in conjunction with beam forming techniques to achieve spatial selectivity In one embodiment, the capture device 20 may further include a processor 42 that may be in operative communication with the image camera component 32. The processor 42 may include a standardized processor, a specialized processor, a microprocessor, or the like that may execute instructions that may include instructions for storing profiles, receiving the depth image, determining whether a suitable target may be included in the depth image, converting the suitable target into a skeletal representation or model of the target, or any other suitable instruction.

Processor 42 may include an imaging signal processor capable of adjusting color, brightness, hue, sharpening, and other elements of the captured digital image.

Figure 3:
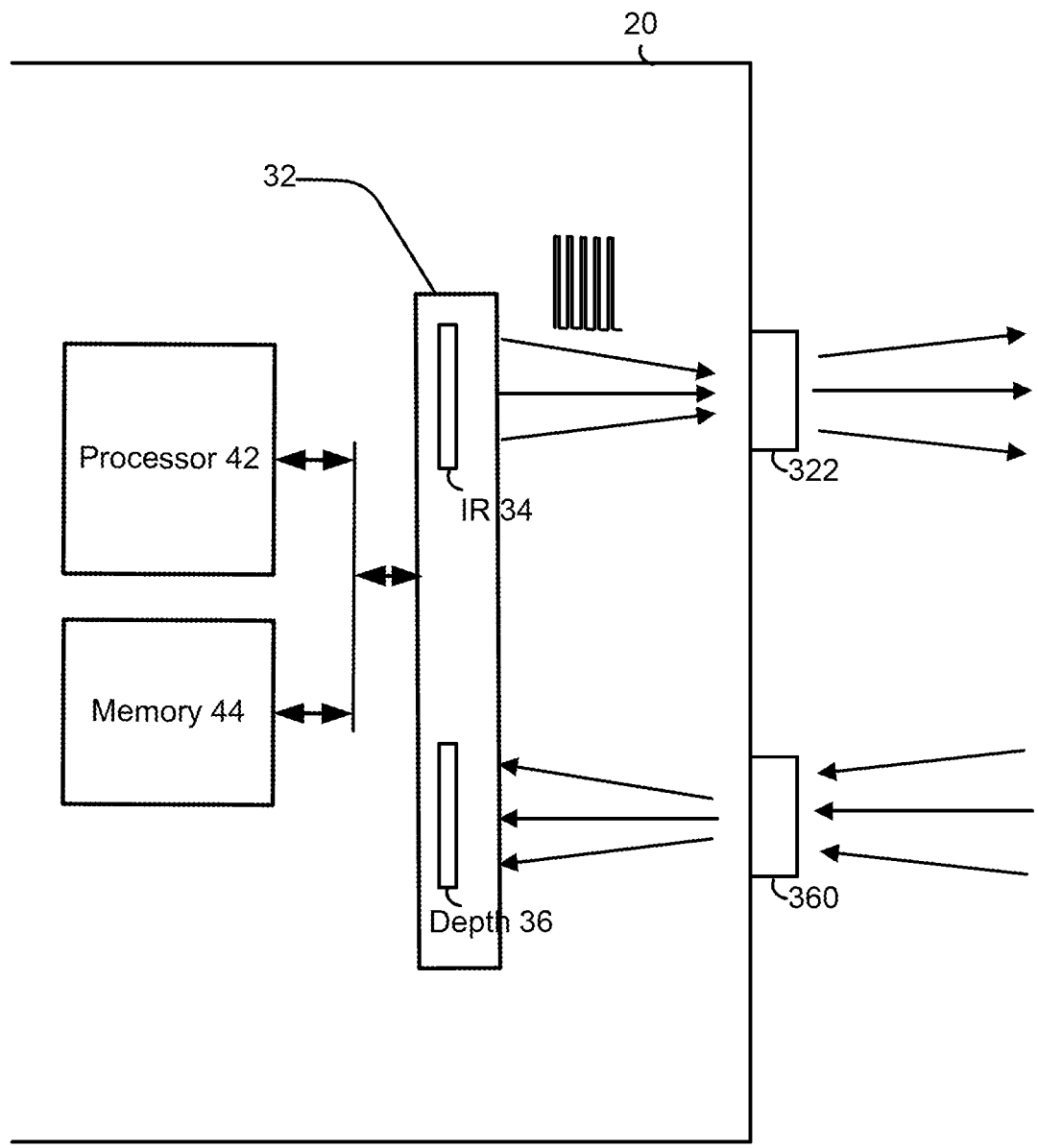
FIG. 3 illustrates one embodiment of the camera illumination and capture technology of the present technology.

The capture device 20 may further include a memory component 44 that may store the instructions that may be executed by the processor 42, images or frames of images captured by the 3-D camera or RGB camera, user profiles or any other suitable information, images, or the like. According to one example, the memory component 44 may include random access memory (RAM), read only memory (ROM), cache, Flash memory, a hard disk, or any other suitable storage component. As shown in FIG. 3, the memory component 44 may be a separate component in communication with the image capture component 32 and the processor 42. In another embodiment, the memory component 44 may be integrated into the processor 42 and/or the image capture component 32. In one embodiment, some or all of the components 32, 34, 36, 38, 40, 42 and 44 of the capture device 20 illustrated in FIG. 2 are housed in a single housing.

The capture device 20 may be in communication with the computing environment 12 via a communication link 46. The communication link 46 may be a wired connection including, for example, a USB connection, a Firewire connection, an Ethernet cable connection, or the like and/or a wireless connection such as a wireless 802.11b, g, a, or n connection. The computing environment 12 may provide a clock to the capture device 20 that may be used to determine when to capture, for example, a scene via the communication link 46.

The capture device 20 may provide the depth information and images captured by, for example, the 3-D camera 36 and/or the RGB camera 38, including a skeletal model that may be generated by the capture device 20, to the computing environment 12 via the communication link 46. The computing environment 12 may then use the skeletal model, depth information, and captured images to, for example, create a virtual screen, adapt the user interface and control an application such as a game or word processor.

A motion tracking system 191 uses the skeletal model and the depth information to provide a control output to an application on a processing device to which the capture device 20 is coupled. The depth information may likewise be used by a gestures library 192, structure data 198, gesture recognition engine 190, depth image processing and object reporting module 194 and operating system 196. Depth image processing and object reporting module 194 uses the depth images to track motion of objects, such as the user and other objects. The depth image processing and object reporting module 194 will report to operating system 196 an identification of each object detected and the location of the object for each frame. Operating system 196 will use that information to update the position or movement of an avatar or other images in the display or to perform an action on the provided user-interface. To assist in the tracking of the objects, depth image processing and object reporting module 194 uses gestures library 190, structure data 198 and gesture recognition engine 190.

The computing system 12 may include one or more applications 300 which utilize the information collected by the capture device for use by user 18. A calibration or initialization component 197 in the memory of the capture device implements technology disclosed herein to allow autonomous operation by a plurality of devices as discussed herein.

Structure data 198 includes structural information about objects that may be tracked. For example, a skeletal model of a human may be stored to help understand movements of the user and recognize body parts. Structural information about inanimate objects may also be stored to help recognize those objects and help understand movement.

Gestures library 192 may include a collection of gesture filters, each comprising information concerning a gesture that may be performed by the skeletal model (as the user moves). A gesture recognition engine 190 may compare the data captured by the cameras 36, 38 and device 20 in the form of the skeletal model and movements associated with it to the gesture filters in the gesture library 192 to identify when a user (as represented by the skeletal model) has performed one or more gestures. Those gestures may be associated with various controls of an application. Thus, the computing environment 12 may use the gestures library 190 to interpret movements of the skeletal model and to control operating system 196 or an application (not shown) based on the movements.

More information about recognizer engine 190 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool" filed on May 29, 2009, both of which are incorporated by reference herein in their entirety. More information about motion detection and tracking can be found in U.S. patent application Ser. No. 12/641,788, "Motion Detection Using Depth Images," filed on Dec. 18, 2009; and U.S. patent application Ser. No. 12/475,308, "Device for Identifying and Tracking Multiple Humans over Time," both of which are incorporated herein by reference in their entirety.

FIG. 3 depicts a partial block diagram of a capture device 20 of FIG. 2. The components can be provided in a single housing. The device 20 includes a IR source 34, which can be activated (powered or turned on) to emit continuous or pulsed light. The IR source 34 can also be deactivated (depowered or turned off) so that it emits no illumination. The light source is modulated or pulsed during depth sensing. If it is turned off, this means that the system is only able to capture color video/images. The IR source acts as an illumination system for the capture device.

Capture device 20 includes a housing mounting a lens 322 and a sensor lens 360. The projection lens 322 and/or sensor lens 360 transmit and receive IR illumination and reflected IR illumination, respectively. Camera 36 is positioned to receive reflected IR illumination though lens 360. In general, IR illumination may be pulsed, the resulting light pulse illuminates the scene and is reflected by the objects. The camera lens gathers the reflected light and images it onto the camera 36. Depending on the distance, the incoming light experiences a delay. As light has a speed of approximately c=300,000,000 meters per second, this delay is very short and the pulse width of the illumination determines the maximum range the camera can handle.

In one embodiment, the capture device uses a recurring window (W) of 33 ms. This recurring window comprises a sequentially recurring window of operation of the capture device. It should be recognized that this window may vary depending on the applications and range for which the capture device is used. In one embodiment, for sensing within a given environment 100 proximate to the capture device 20, an operational window (FIG. 7A) for pulsing and detecting reflections within the recurring window is defined which is based on the range and the speed of light C. Pulsing and sensing may occur many times within the operational window, but in one embodiment completes after 9 ms. It should be understood that the operational window (the pulse and sense window of a device 20) may be any fraction of the recurring window. Each pulse is sent and received within the region 100 within, for example, nanoseconds, resulting in many pulse/sense sequences within the operational window. This means the capture device has operational window (in this embodiment 9 ms), which is shorter than the recurring window (in this embodiment 33 ms). It should be understood that these times are merely exemplary.

A pulse and sensing recurring window (w) and operational windows (x) are illustrated in FIG. 7A.

In accordance with the present technology, the memory 44 can store instructions that are executed by the processor 42 to sequentially provide pulsed illumination and reception to determine depth data over a succession of operational windows. Generally, this is done continuously while the device 20 is operating to provide the desired gesture based interface.

Processor 42 communicates with the IR source to drive or modulate it as described herein. Sensor lens 360 passes reflected IR illumination from the field of view passes and reaches one or more sensors, represented by a depth camera 36. The pulsed reflections are limited to the IR pulses from the source, as any ambient light is rejected through the use of an IR band pass filter (not shown), tuned to permit only light of the wavelength of the IR source to be received. The camera 36 can include one or more CMOS sensors or CCDs, for instance, which have light-sensitive pixels. Each pixel generates charge, and the amount of accumulated or integrated charge can be read as an indication of the light intensity which has reached the pixel.

The processor 42 can include depth data processing which receives readings from the sensor and translates them into depth data for each pixel of the sensor. For example, a reading from a pixel can indicate an amount of accumulated charge and this can be correlated with a light intensity based on characteristics of the sensor. The depth map can be stored in the memory 44, for instance.

As explained above, the capture device 20 provides RGB images (also known as color images) and depth images to the computing environment 12. The depth image may be a plurality of observed pixels where each observed pixel has an observed depth value. For example, the depth image may include a two-dimensional (2-D) pixel area of the captured scene where each pixel in the 2-D pixel area may have a depth value such as a length or distance in, for example, centimeters, millimeters, or the like of an object in the captured scene from the capture device.

Figure 4:
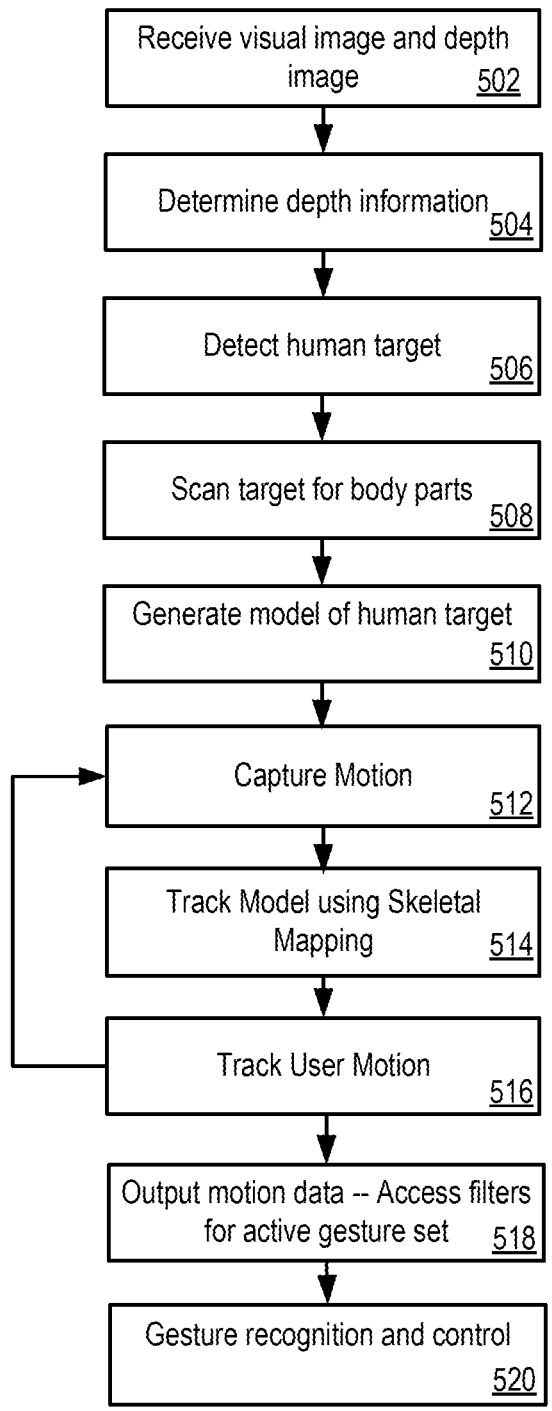
FIG. 4 is a flowchart describing one embodiment of a process for tracking user motion.

FIG. 4 is a flowchart describing one embodiment of a process for gesture control of a user interface as can be performed by tracking system 10 in one embodiment. At step 502, processor 42 of the capture device 20 receives a visual image and depth image from the image capture component 32. In other examples, only a depth image is received at step 502. The depth image and visual image can be captured by any of the sensors in image capture component 32 or other suitable sensors as are known in the art. In one embodiment the depth image is captured separately from the visual image. In some implementations the depth image and visual image are captured at the same time while in others they are captured sequentially or at different times.

In other embodiments the depth image is captured with the visual image or combined with the visual image as one image file so that each pixel has an R value, a G value, a B value and a Z value (representing distance).

At step 504 depth information corresponding to the visual image and depth image are determined. The visual image and depth image received at step 502 can be analyzed to determine depth values for one or more targets within the image. Capture device 20 may capture or observe a capture area that may include one or more targets. At step 506, the capture device determines whether the depth image includes a human target. In one example, each target in the depth image may be flood filled and compared to a pattern to determine whether the depth image includes a human target. In one example, the edges of each target in the captured scene of the depth image may be determined. The depth image may include a two dimensional pixel area of the captured scene for which each pixel in the 2D pixel area may represent a depth value such as a length or distance for example as can be measured from the camera. The edges may be determined by comparing various depth values associated with for example adjacent or nearby pixels of the depth image. If the various depth values being compared are greater than a pre-determined edge tolerance, the pixels may define an edge. The capture device may organize the calculated depth information including the depth image into Z layers or layers that may be perpendicular to a Z-axis extending from the camera along its line of sight to the viewer. The likely Z values of the Z layers may be flood filled based on the determined edges. For instance, the pixels associated with the determined edges and the pixels of the area within the determined edges may be associated with each other to define a target or a physical object in the capture area.

At step 508, the capture device scans the human target for one or more body parts. The human target can be scanned to provide measurements such as length, width or the like that are associated with one or more body parts of a user, such that an accurate model of the user may be generated based on these measurements. In one example, the human target is isolated and a bit mask is created to scan for the one or more body parts. The bit mask may be created for example by flood filling the human target such that the human target is separated from other targets or objects in the capture area elements. At step 510 a model of the human target is generated based on the scan performed at step 508. The bit mask may be analyzed for the one or more body parts to generate a model such as a skeletal model, a mesh human model or the like of the human target. For example, measurement values determined by the scanned bit mask may be used to define one or more joints in the skeletal model. The bitmask may include values of the human target along an X, Y and Z-axis. The one or more joints may be used to define one or more bones that may correspond to a body part of the human.

According to one embodiment, to determine the location of the neck, shoulders, or the like of the human target, a width of the bitmask, for example, at a position being scanned, may be compared to a threshold value of a typical width associated with, for example, a neck, shoulders, or the like. In an alternative embodiment, the distance from a previous position scanned and associated with a body part in a bitmask may be used to determine the location of the neck, shoulders or the like.

In one embodiment, to determine the location of the shoulders, the width of the bitmask at the shoulder position may be compared to a threshold shoulder value. For example, a distance between the two outer most Y values at the X value of the bitmask at the shoulder position may be compared to the threshold shoulder value of a typical distance between, for example, shoulders of a human. Thus, according to an example embodiment, the threshold shoulder value may be a typical width or range of widths associated with shoulders of a body model of a human.

In another embodiment, to determine the location of the shoulders, the bitmask may be parsed downward a certain distance from the head. For example, the top of the bitmask that may be associated with the top of the head may have an X value associated therewith. A stored value associated with the typical distance from the top of the head to the top of the shoulders of a human body may then added to the X value of the top of the head to determine the X value of the shoulders. Thus, in one embodiment, a stored value may be added to the X value associated with the top of the head to determine the X value associated with the shoulders.

In one embodiment, some body parts such as legs, feet, or the like may be calculated based on, for example, the location of other body parts. For example, as described above, the information such as the bits, pixels, or the like associated with the human target may be scanned to determine the locations of various body parts of the human target. Based on such locations, subsequent body parts such as legs, feet, or the like may then be calculated for the human target.

According to one embodiment, upon determining the values of, for example, a body part, a data structure may be created that may include measurement values such as length, width, or the like of the body part associated with the scan of the bitmask of the human target. In one embodiment, the data structure may include scan results averaged from a plurality depth images. For example, the capture device may capture a capture area in frames, each including a depth image. The depth image of each frame may be analyzed to determine whether a human target may be included as described above. If the depth image of a frame includes a human target, a bitmask of the human target of the depth image associated with the frame may be scanned for one or more body parts. The determined value of a body part for each frame may then be averaged such that the data structure may include average measurement values such as length, width, or the like of the body part associated with the scans of each frame. In one embodiment, the measurement values of the determined body parts may be adjusted such as scaled up, scaled down, or the like such that measurement values in the data structure more closely correspond to a typical model of a human body. Measurement values determined by the scanned bitmask may be used to define one or more joints in a skeletal model at step 510.

At step 512, motion is captured from the depth images and visual images received from the capture device. In one embodiment capturing motion at step 514 includes generating a motion capture file based on the skeletal mapping as will be described in more detail hereinafter. At 514, the model created in step 510 is tracked using skeletal mapping and to track user motion at 516. For example, the skeletal model of the user 18 may be adjusted and updated as the user moves in physical space in front of the camera within the field of view. Information from the capture device may be used to adjust the model so that the skeletal model accurately represents the user. In one example this is accomplished by one or more forces applied to one or more force receiving aspects of the skeletal model to adjust the skeletal model into a pose that more closely corresponds to the pose of the human target and physical space.

At step 516 user motion is tracked.

At step 518 motion data is provided to an application, such as a navigation system as described herein. Such motion data may further be evaluated to determine whether a user is performing a pre-defined gesture. Step 518 can be performed based on the UI context or contexts determined in step 516. For example, a first set of gestures may be active when operating in a menu context while a different set of gestures may be active while operating in a game play context. Step 518 can also include determining an active set of gestures. At step 520 gesture recognition and control is performed. The tracking model and captured motion are passed through the filters for the active gesture set to determine whether any active gesture filters are satisfied. Any detected gestures are applied within the computing environment to control the user interface provided by computing environment 12. Step 520 can further include determining whether any gestures are present and if so, modifying the user-interface action that is performed in response to gesture detection.

In one embodiment, steps 516-520 are performed by computing environment 12. Furthermore, although steps 502-514 are described as being performed by capture device 20, various ones of these steps may be performed by other components, such as by computing environment 12. For example, the capture device 20 may provide the visual and/or depth images to the computing environment 12 which will in turn, determine depth information, detect the human target, scan the target, generate and track the model and capture motion of the human target.

Figure 5:
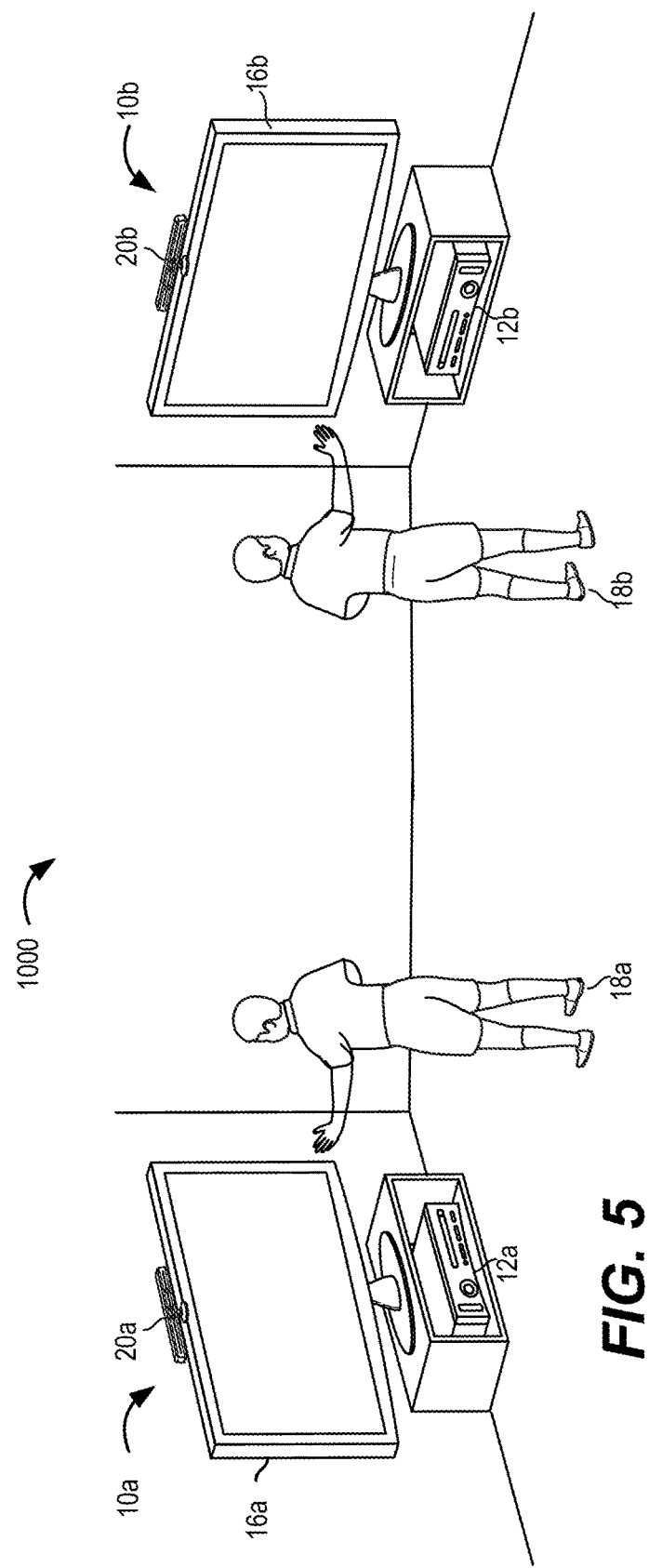
FIG. 5 is a depiction of two users in a physical space utilizing two different capture devices and processing system.

FIG. 5 is an illustration of an application of the present technology. In FIG. 5, a first user 18a and a second user 18b are present on the same physical space 1000. In this instance, two capture devices 20A and 20B are also present, along with systems 10A and 10B. Other elements previously described above for use with systems 10 by each user 18a and 18b are present. In the example shown in FIG. 5, each system 10A and 10B must operate in a manner wherein the illumination and detection does not conflict. One method for doing so is to ensure that the systems 10a and 10b communicate their operational windows with each other. However, requiring a connection between such systems is often impractical and reduces flexibility in the systems.

Figure 6:
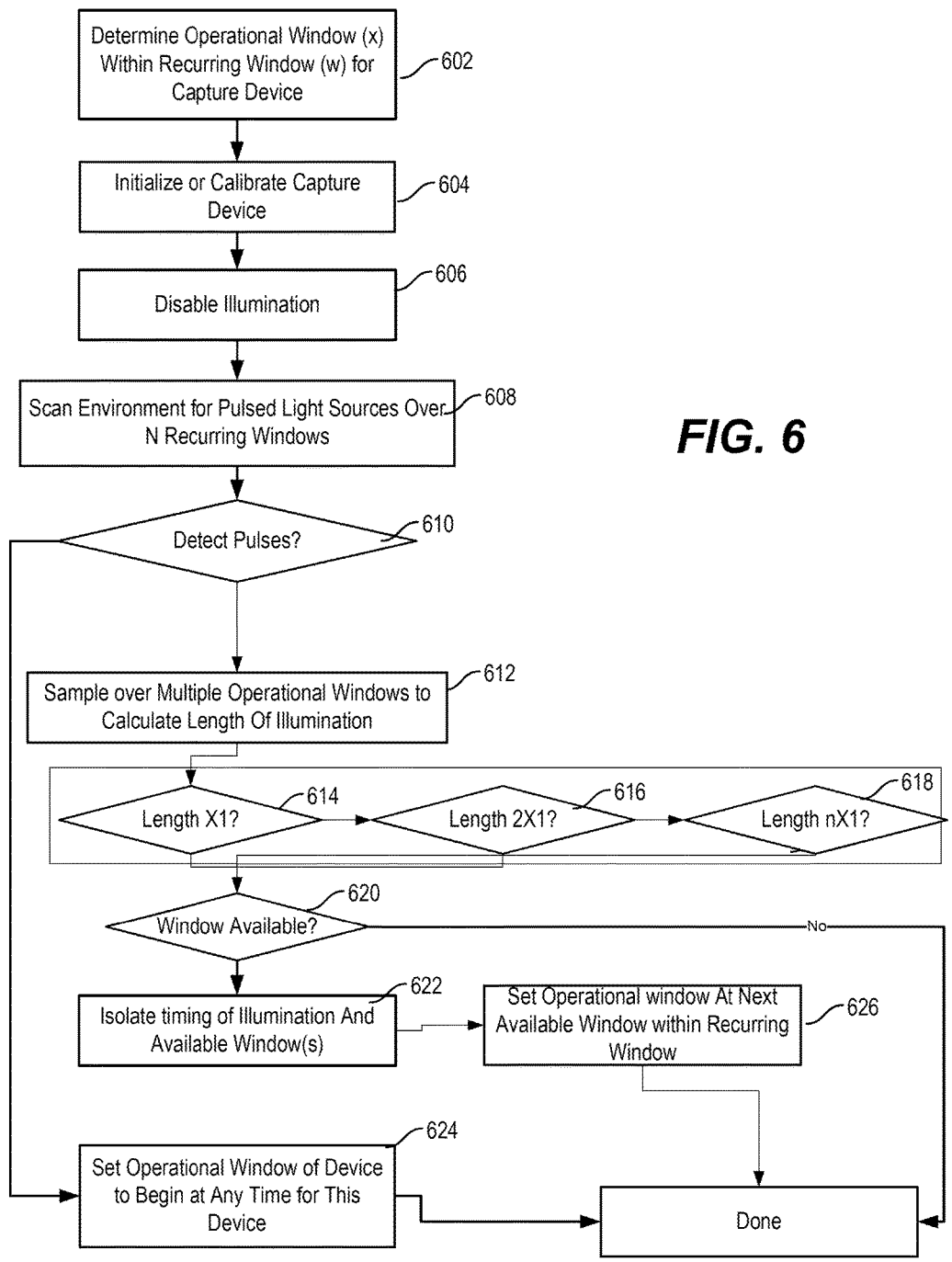
FIG. 6 is a flowchart describing one embodiment for calibrating or initializing a capture device in the presence of other capture devices.

FIG. 6 is a flowchart illustrating a method for self-discovery by a capture device when multiple capture devices are operating in an environment 1000. The technology of FIG. 6 allows the systems to independently determine whether another system is present in a physical proximity which would require coordination between the systems to effect operation.

The method of FIG. 6 may be performed by each capture device as part of an initialization procedure or as part of a re-calibration when such calibration is requested by code in the processor 42 instructing calibration. In one embodiment, all capture devices designed to operate with identically timed recurring and operational windows. The method of FIG. 6 allows a device to determine for itself an operational window within which to pulse and sense within an environment potentially containing other devices.

At 602, a determination of the operational window of time X within a recurring time W for the capture device is made. The operational window may be the pulse and detection window illustrated in FIG. 7A, which is a fraction of the operational window defined by the pulse width of the device. It should be recognized that the operational window and recurring window may vary depending on the applications and range for which the capture device is used. The determination step 602 may be made for each initialization or calibration, or once for any device performing the method of FIG. 6.

At 604, an initialization or calibration of the capture device is initiated. At 606, all illumination sources for the device are disabled. This allows sensor elements of the capture device to detect if other sources of illumination matching a pre-defined pattern or within the recurring window occur.

At 608, the environment is scanned for pulsed light sources occurring in the environment. The scan looks for any illumination sources repeating at intervals within some time frame over a multiple number (N) of recurring windows. If illumination are detected within the scanning time frame of N recurring windows 610, a calculation is made at 612 as to the length of the pulses. The timing calculation at 612 will allow a determination of illumination (or non-illumination) at 615. In one embodiment, a length of pulsing is calculated at steps 614, 616, 618 by determining length of any illumination period within the environment and consequently whether any operational window within a recurring window remains for operation of the device performing the method of FIG. 6.

At 620, a determination is made as to whether an operational window is available based on the length of the pulse/sensing determined at 614, 616, 618. If the illumination detected is of the length of one operational window (e.g. window X1 in FIG. 7B) at step 614, an operational window will be available at 620. If the pulsing detected is of the length of two operational window (e.g. window X1+X2 in FIG. 7B (or 2X1)) at step 614, an operational window will be available at 620. Any number of operations windows (nX1) may be calculated based on the number of operational windows occurring within a recurring window. In the above example of a 33 ms recurring window and a 9 ms operational window, only three operational windows may occur within a recurring window. But if the recurring window is increased to 50 ms, five operational windows may be determined, for example.

If, an operational window is available at 620, then the next available operational window is determined at 622. The next available window begins at the end of any sequence of illumination detected. The next available operational window may be determined by calculating the total time occupied by detected illumination within a recurring window and isolating the next available pulse time for a current device at 626. For example, if the total pulse time of a repeated detected illumination is 9 ms for a device with a 33 ms recurring window, a new operational window can be set to begin immediately at the end of the detected pulses at 10 ms. Similarly, if the total pulse time of a repeated detected illumination is 18 ms, a new operational window can be set to begin immediately at the end of the detected pulses at 19 ms.

In a further alternative, it should be understood that the sampling at 612 and determination at 620 need not strictly measure periods illumination, but can also or alternatively measure repeating periods of no illumination. If a repeating pattern of illumination (and non-illumination) is recognized at 620, a new operational window may be set at 626 curing any such period of non-illumination, as the capture device performing the method of FIG. 6 may use that window for its own pulsing and sensing sequence.

In this manner, the device performing initialization or calibration uses any next available operational window for all devices within a physical view of each other—that is, all devices operating within all the same physical environment can find their own operational window that does not conflict with other capture devices of the same type operating in the same environment.

In one embodiment, all capture devices operate within the same recurring and operational windows can thereby determine an operational window within which to operate based on sequentially recurring windows. In one embodiment, each device performs the method of FIG. 6 such that (1) a first device in any environment would detect not pulses and start a first operational window which defines a recurring window; (2) any second device in the environment would detect the first device's pulsing as illumination and begin a new operational window for itself at the end of the first operational window and (3) any third device in the environment would detect the first and second device pulsing as illumination and begin a new operational window for itself at the end of the second operational window. In another alternative, a second device could start at any point within the recurring window which is not occupied by the illumination of the first device. In such alternative, any third (or subsequent device) would be left to determine if a sufficient period of non-illumination occurs within which to operate for itself. Under this technology, devices may even be pointed directly at each other and operate without conflicting in an operational window.

FIG. 7A illustrates a first operational window within a recurring window. FIG. 7B illustrates a first and a second operational windows within a recurring window. The second operational window in FIG. 7B may comprise a pulsed illumination and sensing sequence identical to the first operational window. In other embodiments the timing of the operational windows may be different and the determination at step 608 may be such that an indication of the operational window of other devices in the environment is determined from the sensing step. As illustrated in FIG. 7B, both operational windows have the same or identical time lengths—in this embodiment 9 ms. The operational window includes a series of pulses and sensing cycles. In FIGS. 7A and 7B, pulses are represented by black lines while sensing periods are illustrated by white gaps. It should be understood that these pulse and sense periods are not to scale. As illustrated, each operational window recurs over the same period as the recurring window. That is, as shown in FIG. 7B, operational window for a first device (operational window A) repeats in the second recurring windows, as does the operational window for a second device—operational window B. Two recurring windows are illustrated but it should be understood that the recurring windows repeat for as long as the capture device is scanning.

Figure 8:
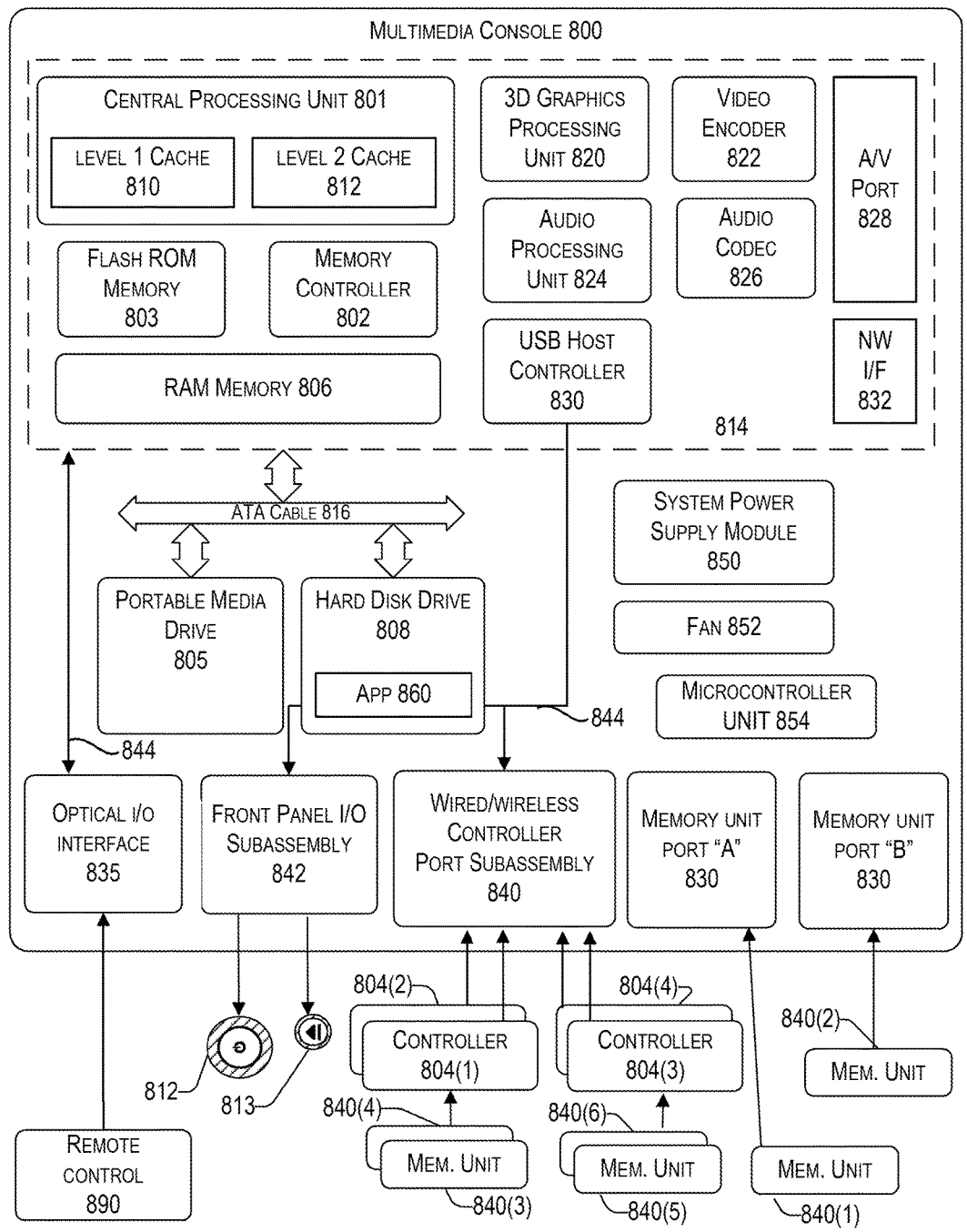
FIG. 8 illustrates a first processing device in accordance with the present technology.

FIG. 8 is a block diagram of one embodiment of a computing system that can be used to implement a hub computing system like that of FIGS. 1A and 1B. In this embodiment, the computing system is a multimedia console 800, such as a gaming console. As shown in FIG. 8, the multimedia console 800 has a central processing unit (CPU) 801, and a memory controller 802 that facilitates processor access to various types of memory, including a flash Read Only Memory (ROM) 803, a Random Access Memory (RAM) 806, a hard disk drive 808, and portable media drive 806. In one implementation, CPU 801 includes a level 1 cache 810 and a level 2 cache 812, to temporarily store data and hence reduce the number of memory access cycles made to the hard drive 808, thereby improving processing speed and throughput.

CPU 801, memory controller 802, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 801, memory controller 802, ROM 803, and RAM 806 are integrated onto a common module 814. In this implementation, ROM 803 is configured as a flash ROM that is connected to memory controller 802 via a PCI bus and a ROM bus (neither of which are shown). RAM 806 is configured as multiple Double Data Rate Synchronous Dynamic RAM (DDR SDRAM) modules that are independently controlled by memory controller 802 via separate buses (not shown). Hard disk drive 808 and portable media drive 805 are shown connected to the memory controller 802 via the PCI bus and an AT Attachment (ATA) bus 816. However, in other implementations, dedicated data bus structures of different types can also be applied in the alternative.

A graphics processing unit 820 and a video encoder 822 form a video processing pipeline for high speed and high resolution (e.g., High Definition) graphics processing. Data are carried from graphics processing unit (GPU) 820 to video encoder 822 via a digital video bus (not shown). Lightweight messages generated by the system applications (e.g., pop ups) are displayed by using a GPU 820 interrupt to schedule code to render popup into an overlay. The amount of memory used for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resync is eliminated.

An audio processing unit 824 and an audio codec (coder/decoder) 826 form a corresponding audio processing pipeline for multi-channel audio processing of various digital audio formats. Audio data are carried between audio processing unit 824 and audio codec 826 via a communication link (not shown). The video and audio processing pipelines output data to an A/V (audio/video) port 828 for transmission to a television or other display. In the illustrated implementation, video and audio processing components 820-828 are mounted on module 214.

FIG. 8 shows module 814 including a USB host controller 830 and a network interface 832. USB host controller 830 is shown in communication with CPU 801 and memory controller 802 via a bus (e.g., PCI bus) and serves as host for peripheral controllers 804(1)-804(4). Network interface 832 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 8 console 800 includes a controller support subassembly 840 for supporting four controllers 804(1)-804(4). The controller support subassembly 840 includes any hardware and software components needed to support wired and wireless operation with an external control device, such as for example, a media and game controller. A front panel I/O subassembly 842 supports the multiple functionalities of power button 812, the eject button 813, as well as any LEDs (light emitting diodes) or other indicators exposed on the outer surface of console 802. Subassemblies 840 and 842 are in communication with module 814 via one or more cable assemblies 844. In other implementations, console 800 can include additional controller subassemblies. The illustrated implementation also shows an optical I/O interface 835 that is configured to send and receive signals that can be communicated to module 814.

MUs 840(1) and 840(2) are illustrated as being connectable to MU ports "A" 830(1) and "B" 830(2) respectively. Additional MUs (e.g., MUs 840(3)-840(6)) are illustrated as being connectable to controllers 804(1) and 804(3), i.e., two MUs for each controller. Controllers 804(2) and 804(4) can also be configured to receive MUs (not shown). Each MU 840 offers additional storage on which games, game parameters, and other data may be stored. In some implementations, the other data can include any of a digital game component, an executable gaming application, an instruction set for expanding a gaming application, and a media file. When inserted into console 800 or a controller, MU 840 can be accessed by memory controller 802. A system power supply module 850 provides power to the components of gaming system 800. A fan 852 cools the circuitry within console 800. A microcontroller unit 854 is also provided.

An application 860 comprising machine instructions is stored on hard disk drive 808. When console 800 is powered on, various portions of application 860 are loaded into RAM 806, and/or caches 810 and 812, for execution on CPU 801, wherein application 860 is one such example. Various applications can be stored on hard disk drive 808 for execution on CPU 801.

Gaming and media system 800 may be operated as a standalone system by simply connecting the system to monitor 16 (FIG. 1), a television, a video projector, or other display device. In this standalone mode, gaming and media system 800 enables one or more players to play games, or enjoy digital media, e.g., by watching movies, or listening to music. However, with the integration of broadband connectivity made available through network interface 832, gaming and media system 800 may further be operated as a participant in a larger network gaming community.

Figure 9:
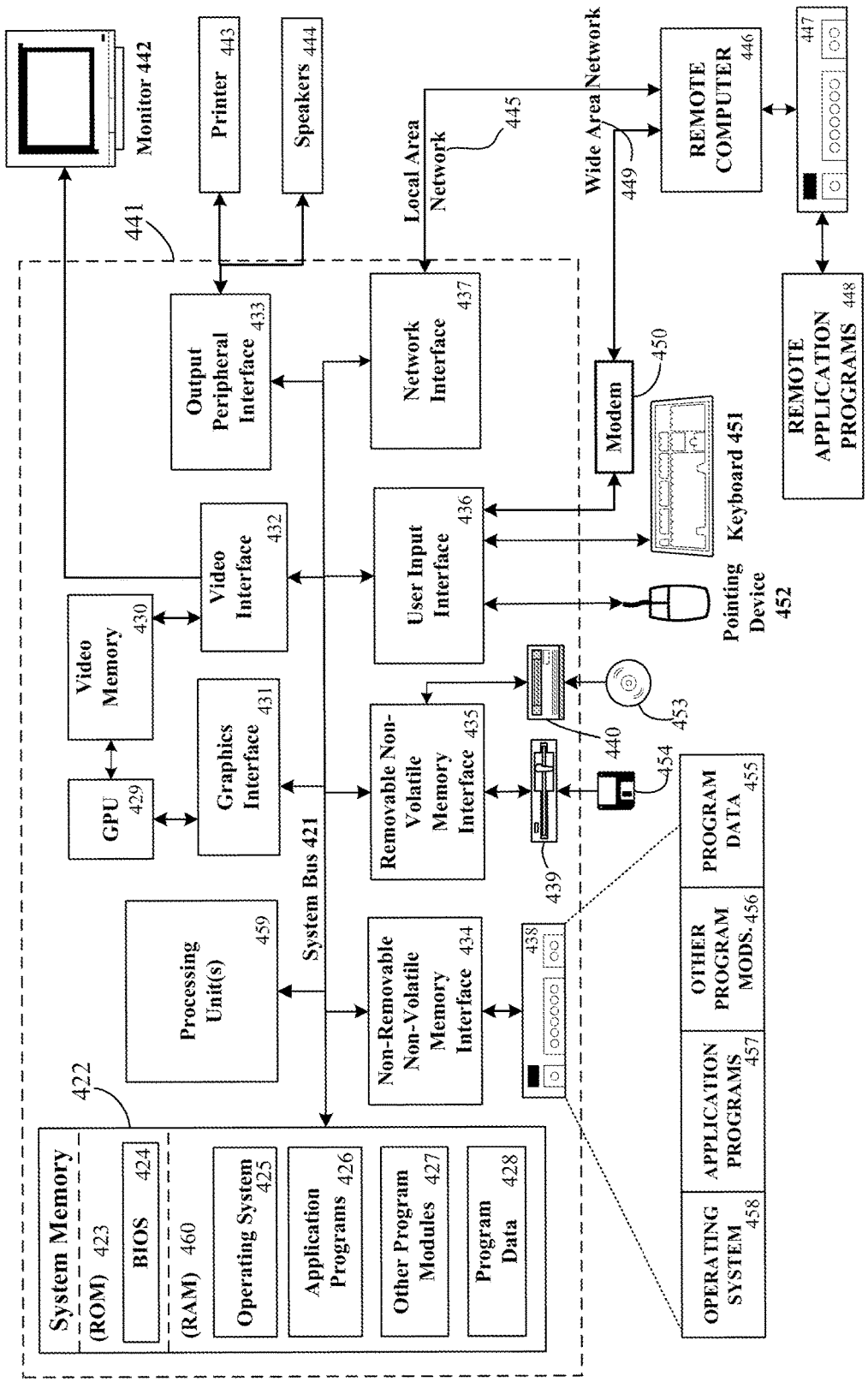
FIG. 9 illustrates a second processing device in accordance with the present technology.

The system described above can be used to add virtual images to a user's view such that the virtual images are mixed with real images that the user see. In one example, the virtual images are added in a manner such that they appear to be part of the original scene. Examples of adding the virtual images can be found U.S. patent application Ser. No. 13/112,919, "Event Augmentation With Real-Time Information," filed on May 20, 2011; and U.S. patent application Ser. No. 12/905,952, "Fusing Virtual Content Into Real Content," filed on Oct. 15, 2010; both applications are incorporated herein FIG. 9 illustrates another example embodiment of a computing system 420 that may be the computing system 112 shown in FIGS. 1A-2B used to track motion and/or animate (or otherwise update) an avatar or other on-screen object displayed by an application. The computing system environment 420 is only one example of a suitable computing system and is not intended to suggest any limitation as to the scope of use or functionality of the presently disclosed subject matter. Neither should the computing system 420 be interpreted as having any dependency or requirement relating to any one or combination of components illustrated in the exemplary operating system 420. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computing system 420 comprises a computer 441, which typically includes a variety of computer readable media. Computer readable media can be any available media that can be accessed by computer 441 and includes both volatile and nonvolatile media, removable and non-removable media. The system memory 422 includes computer storage media in the form of volatile and/or nonvolatile memory such as read only memory (ROM) 423 and random access memory (RAM) 460. A basic input/output system 424 (BIOS), containing the basic routines that help to transfer information between elements within computer 441, such as during start-up, is typically stored in ROM 423. RAM 460 typically contains data and/or program modules that are immediately accessible to and/or presently being operated on by processing unit 459. By way of example, and not limitation, FIG. 9 illustrates operating system 425, application programs 426, other program modules 427, and program data 428.

The computer 441 may also include other removable/non-removable, volatile/nonvolatile computer storage media. By way of example only, FIG. 9 illustrates a hard disk drive 438 that reads from or writes to non-removable, nonvolatile magnetic media, a magnetic disk drive 439 that reads from or writes to a removable, nonvolatile magnetic disk 454, and an optical disk drive 440 that reads from or writes to a removable, nonvolatile optical disk 453 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 438 is typically connected to the system bus 421 through an non-removable memory interface such as interface 434, and magnetic disk drive 439 and optical disk drive 440 are typically connected to the system bus 421 by a removable memory interface, such as interface 435.

The drives and their associated computer storage media discussed above and illustrated in FIG. 9, provide storage of computer readable instructions, data structures, program modules and other data for the computer 441. In FIG. 9, for example, hard disk drive 438 is illustrated as storing operating system 458, application programs 457, other program modules 456, and program data 455. Note that these components can either be the same as or different from operating system 425, application programs 426, other program modules 427, and program data 428. Operating system 458, application programs 457, other program modules 456, and program data 455 are given different numbers here to illustrate that, at a minimum, they are different copies. A user may enter commands and information into the computer 441 through input devices such as a keyboard 451 and pointing device 452, commonly referred to as a mouse, trackball or touch pad. Other input devices (not shown) may include a microphone, joystick, game pad, satellite dish, scanner, or the like. These and other input devices are often connected to the processing unit 459 through a user input interface 436 that is coupled to the system bus, but may be connected by other interface and bus structures, such as a parallel port, game port or a universal serial bus (USB). The cameras 226, 228 and capture environment 120 may define additional input devices for the computing system 420 that connect via user input interface 436. A monitor 442 or other type of display device is also connected to the system bus 421 via an interface, such as a video interface 432. In addition to the monitor, computers may also include other peripheral output devices such as speakers 444 and printer 443, which may be connected through a output peripheral interface 433. Capture Environment 120 may connect to computing system 420 via output peripheral interface 433, network interface 437, or other interface.

The computer 441 may operate in a networked environment using logical connections to one or more remote computers, such as a remote computer 446. The remote computer 446 may be a personal computer, a server, a router, a network PC, a peer device or other common network node, and typically includes many or all of the elements described above relative to the computer 441, although only a memory storage device 447 has been illustrated in FIG. 9. The logical connections depicted include a local area network (LAN) 445 and a wide area network (WAN) 449, but may also include other networks. Such networking environments are commonplace in offices, enterprise-wide computer networks, intranets and the Internet.

When used in a LAN networking environment, the computer 441 is connected to the LAN 445 through a network interface or adapter 437. When used in a WAN networking environment, the computer 441 typically includes a modem 450 or other means for establishing communications over the WAN 449, such as the Internet. The modem 450, which may be internal or external, may be connected to the system bus 421 via the user input interface 436, or other appropriate mechanism. In a networked environment, program modules depicted relative to the computer 441, or portions thereof, may be stored in the remote memory storage device. By way of example, and not limitation, FIG. 9 illustrates application programs 448 as residing on memory device 447. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method providing for autonomous operation of a capture device having an illumination system and an image capture system, the method comprising:
   while the illumination system of the capture device is not illuminating, using the image capture system of the capture device to scan an environment proximate to the capture device for repeating segments of illumination and non-illumination by another illumination system, wherein the capture device is separate and autonomous from the other illumination system;
   based on the scan, determining a stretch of non-illumination that occurs in the environment proximate to the capture device that has a duration of sufficient operational time; and
   establishing an operational window of illumination for the illumination system of the capture device within the determined stretch of non-illumination by the other illumination system.

2. The method of claim 1 further including activating the illumination system within the established operational window.

3. The method of claim 2 wherein the established operational window of the illumination system begins substantially at a start of the determined stretch of non-illumination.

4. The method of claim 2 wherein the established operational window of the illumination system begins and ends inside the determined stretch of non-illumination.

5. The method of claim 1 wherein the establishing of the operational window of illumination for the illumination system within the determined stretch of non-illumination by the other illumination system further includes establishing one or more additional operational windows of illumination for the illumination system of the capture device within the determined stretch of non-illumination.

6. The method of claim 1 wherein the established operational window of illumination has a same time length as the repeating segments of illumination by the other illumination system.

7. The method of claim 1 further including establishing at least two operational windows of illumination within the determined stretch of non-illumination, wherein a first established operational window of the at least two operational windows has a different length of time than a second established window of the at least two operational windows.

8. A first capture device among a plurality of capture devices each having a respective device illumination source, the first capture device comprising:
   a respective first depth imaging sensor having a field of view;
   a respective first device illumination source;
   a processor communicatively coupled to the respective first depth imaging sensor and the respective first device illumination source;
   wherein the first capture device is separate and autonomous from each other capture device of the plurality of capture devices, and the processor of the first capture device is configured to:
      cause the respective first depth imaging sensor to scan the field of view for at least one other device illumination source of a respective at least one other capture device of the plurality of capture devices operating proximate to the first capture device;
      determine presence of a respective recurring window of time used by the at least one other device illumination source, the respective recurring window including a time segment of illumination sourced by the at least one other device illumination source and a time segment of non-illumination by the at least one other device illumination source;

determine the time segment of illumination sourced by the at least one other device illumination source as being an operational window of time for the at least one other device illumination source, the operational window being a fraction of length of time relative to the recurring window;

determine a beginning and an end of the operational window; and establish a new operational window within the recurring window.

9. The capture device of claim 8 wherein the establishing of the new operational window comprises engaging the respective first device illumination source of the first capture device at a time outside that of any existing operational window detected prior to the establishing of the new operational window, the engaging of the respective first device illumination source occurring within the recurring window, and receiving reflected illumination from the respective first device illumination source within the new operational window.

10. The capture device of claim 8 wherein if illumination does not occur within the recurring window, engaging the first device illumination source at regularly occurring intervals coinciding with the time of the recurring window and receiving reflected illumination from the first device illumination source thereby establishing the new operational window.

11. The capture device of claim 8 wherein the determining includes determining multiple operational windows within the recurring window.

12. The capture device of claim 8 wherein all operational windows and new operational windows have an identical time length.

13. A first depth and image capture device configured for detecting movements of a user in a first physical environment where the first physical environment is covered by one or more other depth and image capture devices separate from the first depth and image capture device, the first depth and image capture device comprising:

a first depth imaging sensor having a field of view, a first device illumination source, and a processor;

wherein the first depth and image capture device is autonomous from each of the one or more other depth and image capture devices, and the processor of the first depth and image capture device is configured to:

power off the first device illumination source;

after powering off the first device illumination source, causing the first depth imaging sensor to scan the field of view for any other illumination sources of the one or more other depth and image capture devices operating proximate to the first depth and image capture device;

determine presence of a respective recurring window of time used by at least one other illumination source of the other illumination sources, the respective recurring window including a time segment of illumination sourced by the at least one other illumination source and a time segment of non-illumination by the at least one other illumination source;

determine the time segment of illumination sourced by the at least one other illumination source as being an operational window of time, the determined operational window including an illumination period and a reflection period;

determine a start and an end of the determined operational window;

cause the first device illumination source to scan the field of view by repeatedly engaging the first device illumination source in a new recurring operational window at a time outside the determined operational window and within the recurring window; and receiving reflected illumination sourced by the first device illumination source via the first depth imaging sensor within the new operational window.

14. The first depth and image capture device of claim 13 wherein if illumination does not occur within the recurring window, engaging the first device illumination source at regularly occurring intervals coinciding with a time of the recurring window and receiving reflected illumination from the first device illumination source thereby establishing the new operational window.

15. The first depth and image capture device of claim 14 wherein the new operational window begins at an end of all operational windows within the recurring operational windows within the recurring window.

16. The first depth and image capture device of claim 15 wherein the determining includes determining multiple operational windows within the recurring window.

17. The first depth and image capture device of claim 16 wherein all operational windows and new operational windows have a same time length.

* * * * *